(12) United States Patent
Zhuang et al.

(10) Patent No.: US 12,727,969 B2
(45) Date of Patent: Sep. 8, 2026

(54) SHELL-LIKE ORTHODONTIC APPLIANCE, DESIGN METHOD AND MANUFACTURING METHOD FOR THE SAME, ORTHODONTIC APPLIANCE SET AND SYSTEM

(71) Applicant: Shanghai Smartee Denti-Technology Co., Ltd., Shanghai (CN)

(72) Inventors: Huimin Zhuang, Shanghai (CN); Jie Shen, Shanghai (CN); Gang Wu, Shanghai (CN); Xingxing Wang, Shanghai (CN); Junfeng Yao, Shanghai (CN); Tao Guo, Shanghai (CN); Jianyu Jiang, Shanghai (CN); Te Wang, Shanghai (CN); Ziqing Xu, Shanghai (CN); Gang Shen, Shanghai (CN)

(73) Assignee: SHANGHAI SMARTEE DENTI-TECHNOLOGY CO., LTD., Shanghai (CN)

( * ) Notice: Subject to any disclaimer, the term of this patent is extended or adjusted under 35 U.S.C. 154(b) by 446 days.

(21) Appl. No.: 18/170,999

(22) Filed: Feb. 17, 2023

(65) Prior Publication Data

US 2023/0200945 A1 Jun. 29, 2023

Related U.S. Application Data

(63) Continuation of application No. PCT/CN2020/033426, filed on Dec. 2, 2020.

(30) Foreign Application Priority Data

Aug. 21, 2020 (CN) ......................... 202010847390.1
Aug. 21, 2020 (CN) ......................... 202021759535.4

(51) Int. Cl.
*A61C 7/08* (2006.01)
*A61C 7/36* (2006.01)

(52) U.S. Cl.
CPC . *A61C 7/08* (2013.01); *A61C 7/36* (2013.01)

(58) Field of Classification Search
None
See application file for complete search history.

(56) References Cited

U.S. PATENT DOCUMENTS 4,370,129 A * 1/1983 Huge ....................... A61C 7/08 433/6
4,557,692 A 12/1985 Chorbajian
(Continued)

FOREIGN PATENT DOCUMENTS

CN 110063801 A 7/2019
CN 110584805 A 12/2019
(Continued)

OTHER PUBLICATIONS

Shanghai Smartee Denti-Technology Co., Ltd., International Search Report with English translation, PCT/CN2020/133426, May 19, 2021, 8 pgs.

(Continued)

*Primary Examiner* — Heidi M Eide
(74) *Attorney, Agent, or Firm* — Nicholas Mesiti, Esq.; Heslin Rothenberg Farley & Mesiti P.C.

(57) ABSTRACT

A shell-like orthodontic appliance includes a shell-like body provided with a cavity accommodating a plurality of maxillary teeth. A sagittal adjustment portion is provided at a lingual side in an anterior region of the shell-like body. The sagittal adjustment portion is configured to adjust a maxillomandibular position relationship while at least to partially offset deformation of the shell-like body caused by occlusion, and the sagittal adjustment portion is at least partially connected to the lingual side in the anterior region of the shell-like body. The sagittal adjustment portion has a geometric structure configured to stabilize a maxillomandibular occlusion relationship and reduce a deformation of the (Continued)

shell-like body caused by occlusion while to adjust positions of teeth in a mandibular anterior region relative to a maxilla upward to target occlusion positions in a sagittal direction.

21 Claims, 6 Drawing Sheets

(56) References Cited

U.S. PATENT DOCUMENTS 5,324,196 A 6/1994 Magill
5,957,686 A * 9/1999 Anthony .................. A61C 7/08 433/215
8,573,224 B2 * 11/2013 Thornton ................ A61F 5/566 433/214
10,588,776 B2 3/2020 Cam et al.
2003/0190576 A1 * 10/2003 Phan ........................ A61C 7/00 433/19
2003/0207224 A1 * 11/2003 Lotte ........................ A61C 7/08 433/6
2005/0022824 A1 * 2/2005 Ball ........................ A61F 5/566 128/861
2005/0072435 A1 * 4/2005 Eubank .................... A61C 7/08 128/861
2006/0078840 A1 4/2006 Robson
2006/0099546 A1 * 5/2006 Bergersen ................ A61C 7/36 433/6
2008/0053463 A1 * 3/2008 Enoch ..................... A61F 5/566 128/861
2011/0094522 A1 * 4/2011 Weisflog .................. A61C 7/36 128/861
2013/0098375 A1 * 4/2013 Urbanek ................ A63B 71/08 128/861
2013/0104911 A1 * 5/2013 Luffey .................... A61F 5/566 128/860
2015/0000677 A1 * 1/2015 Magness ................. A61F 5/566 128/861
2015/0079531 A1 * 3/2015 Heine ...................... A61C 7/08 433/19
2015/0238283 A1 * 8/2015 Tanugula ............... A61C 7/002 700/98
2018/0078342 A1 * 3/2018 Gardner ................... A61C 7/36
2018/0078344 A1 * 3/2018 Falkel ...................... A61C 7/36
2019/0000592 A1 * 1/2019 Cam .................... A61C 9/0046
2020/0060797 A1 * 2/2020 Sachdeva ................. A61C 7/10
2020/0289310 A1 9/2020 Cote
2021/0169618 A1 * 6/2021 Nishimuta ............... A61C 7/08
2021/0353451 A1 * 11/2021 Wiele ....................... A61C 7/36
2022/0023006 A1 * 1/2022 Mah ....................... A61C 7/002

FOREIGN PATENT DOCUMENTS

CN 110809456 A 2/2020
CN 111012530 A 4/2020
CN 210612259 U 5/2020
CN 111227963 A 6/2020
CN 111281578 A 6/2020
CN 210931950 U 7/2020
CN 211067108 U 7/2020
CN 111529096 A 8/2020
CN 212699186 U 3/2021
CN 215019358 U 12/2021
FR 2641964 A1 7/1990
JP 2007098018 A 4/2007
RU 2692447 C1 6/2019
WO 2020123592 A1 6/2020

OTHER PUBLICATIONS

Shanghai Smartee Denti-Technology Co., Ltd., RU First Office Action with English translation, RU 2023104387, Mar. 30, 2023, 14 pgs.

T. K. Shkavro, et al., "Orthodontic appliances, Study guide", Irkutsk, Irkutsk State Medical University, 2017, 3 pgs. https://mir.ismu.baikal.ru/src/downloads/73ffc9bc_ortodonticheskie_apparaty.pdf.

S.I. Ozhegov, "Russian language Dictionary", Moscow, publisher «Russian language», 1991, 3 pgs. https://cyberlan.com.ua/wp-content/uploads/2015/07/Tolkovij-slovarj-russkogo-yazika.pdf.

Shanghai Smartee Denti-Technology Co., Ltd., European Search Report, EP20950129.5, Dec. 18, 2023, 9 pgs.

Shanghai Smartee Denti-Technology Co., Ltd., Chinese First Examination Report with English Translation, CN202010847390.1, Nov. 21, 2024, 18 pgs.

Shanghai Smartee Denti-Technology Co., Ltd., Chinese Second Examination Report with English Translation, CN202010847390.1, Jun. 30, 2025, 9 pgs.

* cited by examiner

SHELL-LIKE ORTHODONTIC APPLIANCE, DESIGN METHOD AND MANUFACTURING METHOD FOR THE SAME, ORTHODONTIC APPLIANCE SET AND SYSTEM

CROSS REFERENCE TO RELATED APPLICATIONS

The present application a continuation of International Application No. PCT/CN2020/133426, filed on Dec. 2, 2020, which claims priority to Chinese patent applications No. 202010847390.1 and No. 202021759535.4 filed on Aug. 21, 2020. Each of aforementioned applications is hereby incorporated by reference in its entirety.

TECHNICAL FIELD

The present disclosure belongs to the field of medical instrument, and relates to a shell-like orthodontic appliance and a design method and a manufacturing method for the same, an orthodontic appliance set and system.

BACKGROUND

A bad oral-cavity habit, taking about ¼ of varied causes of malocclusion, is one of the most common cause of malocclusion, according to statistics by the Peking University. Anterior-teeth deep overbite is a malocclusion due to vertical heteroplasia of any one or two of maxillary and mandibular arches and/or maxillary and mandibular bones. Anterior-teeth deep overbite is represented by that an incisal edge of maxillary anterior teeth covers over ⅓ a length of a dental crown of mandibular anterior teeth at a labial side, or that an incisal edge of the mandibular anterior teeth occludes at a position over ⅓ of a dental crown of the maxillary anterior teeth at a lingual side. It is quite likely for a patient of anterior-teeth deep overbite to bite his gingiva, leading to such diseases as periodontitis of the anterior teeth and facial joint diseases. Correction to deep overbite generally determines whether an orthodontic treatment is successful or not. The objective of correcting deep overbite is to correct a steep Spee curve of a mandible and a compensation curve of a maxilla, so as to finally acquire a normal Spee curve and compensation curve of normal maxillary and mandible teeth, and coordinate anterior teeth in terms of overbite and covering. Among most patients of malocclusion, correction to deep overbite may be a first step in an entire orthodontic treatment procedure, while to open occlusion is key to correcting deep overbite.

In existing technologies, generally, a maxillary removable orthodontic appliance is used to maintain a height of an anterior alveolarbone unchanged. Emphasis is on rising of height of posterior teeth. Grinding pads are adjusted one by one from a last tooth, so that paired teeth are elongated to contact each other. After the posterior teeth rise, correction on lingual malposition of the anterior teeth and distal posterior teeth are performed. Alternatively, an horizontal guide may be provided at a lingual side of the maxillary anterior region. However, this method demands a horizontal guide made of metal and resin to be fixed on the maxilla. This not only causes suspension of some teeth but also affects chewing of a patient wearing the appliance. The patient may have a strong sense of a foreign matter.

Therefore, it is significant to improve a structure of an invisible orthodontic appliance to obtain a new invisible orthodontic appliance that not only achieves the effects of correction by the maxillary removable orthodontic appliance or correction aided by the horizontal guide, but also has wearing advantages of the invisible orthodontic appliance.

SUMMARY

Some embodiments of the present disclosure provide a shell-like orthodontic appliance, a design method and a manufacturing method for the same, an orthodontic appliance set and system. The present disclosure solves the problem of using an invisible orthodontic appliance to adjust positions of teeth in the mandibular anterior region in a sagittal direction while reducing deformation of the shell-like orthodontic appliance caused by occlusion, which are not yet achieved in the existing technologies.

In a first aspect, some embodiments of the present disclosure provide a shell-like orthodontic appliance including a shell-like body provided with a cavity accommodating a plurality of maxillary teeth. A sagittal adjustment portion is provided at a lingual side in an anterior region of the shell-like body. The sagittal adjustment portion is configured to adjust a maxillomandibular position relationship while at least to partially offset deformation of the shell-like body caused by occlusion, and the sagittal adjustment portion is at least partially connected to the lingual side in the anterior region of the shell-like body. The sagittal adjustment portion has a geometric structure configured to stabilize a maxillomandibular occlusion relationship and reduce a deformation of the shell-like body caused by occlusion while to adjust positions of teeth in the mandibular anterior region relative to a maxilla upward to target occlusion positions in a sagittal direction.

Herein, the sagittal adjustment portion includes a side wall of an accommodation space and a first reinforcing portion. The accommodation space is formed by extending and bending of the lingual side in the anterior region of the shell-like body, and the first reinforcing portion is configured to at least partially offset deformation of the shell-like body caused by occlusion. The accommodation space at least accommodates an incisal edge of the teeth in the mandibular anterior region or a portion adjacent to the incisal edge, and an end of the first reinforcing portion is connected to an end of the side wall away from the shell-like body.

Herein, in a long axis direction of the teeth on a sagittal cross section, a region of the first reinforcing portion contacting a mandible is more adjacent to an incisal edge of in the maxillary anterior region relative to a region of the accommodation space contacting the mandible.

Herein, on the sagittal cross section, a first intersection angle $\alpha$ is formed at a connection between the first reinforcing portion and a side wall of the accommodation space, and $90° \leq \alpha \leq 160°$.

Herein, a connection between the first reinforcing portion and the shell-like body is a smooth transiting curved surface.

Herein, the first reinforcing portion is connected with a mesial end surface of a cavity accommodating first premolar tooth at both left and right sides of the shell-like body in a smooth transition.

Herein, a side of the first reinforcing portion away from the teeth in the maxillary anterior region substantially anastomoses a curve radian of teeth in an anterior region.

Herein, on the sagittal cross section, the first reinforcing portion has a width of 2 to 5 mm in a mesial-distal direction.

Herein, the accommodation space is a groove continuously distributed or partially continuously distributed at a lingual side of the teeth in the maxillary anterior region and concaved in a palate direction, and the groove is configured to reduce deformation of the shell-like body generated in a buccal lingual side direction or in a sagittal direction.

Herein, the accommodation space has a height difference in a long axis direction of the teeth on the sagittal cross section, the height difference being ¼-½ a length of a dental crown of the teeth in the mandibular anterior region along the long axis direction.

Herein, the accommodation space has a width of 1.5 to 4.0 mm in a mesial-distal direction on the sagittal cross section.

Herein, the first reinforcing portion has an elastic modulus greater than an elastic modulus of the shell-like body.

Herein, the first reinforcing portion has a hardness greater than a hardness of the shell-like body.

Herein, the first reinforcing portion has a Shore hardness of 65D to 80D, and the shell-like body has a Shore hardness of 50D to 75D.

Herein, the first reinforcing portion has a multi-layered structure including a basic layer and a reinforcing layer, and at least one reinforcing layer at least partially covers the basic layer.

Herein, the first reinforcing portion formed by the multi-layered structure has a total thickness greater than a thickness of the shell-like body.

Herein, the reinforcing layer has an elastic modulus greater than an elastic modulus of the basic layer.

Herein, the first reinforcing portion has a thickness of 0.7 to 2.0 mm, and the shell-like body has a thickness of 0.5 to 1.0 mm.

Herein, the first reinforcing portion, the accommodation space and the shell-like body are integrally formed.

Herein, a second reinforcing portion is provided at an end of the first reinforcing portion extending in a distal direction, the first reinforcing portion and the second reinforcing portion enclose to form an accommodating space, the first reinforcing portion and the second reinforcing portion form a second intersection angle $\beta$, and $90° \leq \beta < 180°$.

Herein, the accommodating space accommodates a reinforcing block.

Herein, the second reinforcing portion is provided with a male-female structure matching the reinforcing block.

Herein, the second reinforcing portion is provided with a convex blister protruding in a distal direction, and a convex portion matching the convex blister is provided at the convex blister corresponding to a region of the reinforcing block contacting the second reinforcing portion.

Herein, the side wall of the accommodation space includes a mesial accommodation side wall and a distal accommodation side wall, a portion of the mesial accommodation side wall adjacent to a maxillary incisal edge is at least partially connected to the lingual side in the anterior region of the shell-like body, and a portion of the mesial accommodation side wall away from the maxillary incisal edge is at least partially connected to an end of the distal accommodation side wall. Another end of the distal accommodation side wall is at least partially connected to the first reinforcing portion.

Herein, the distal accommodation side wall is a guide surface configured to guide the mandible to slide into the accommodation space.

Herein, the guide surface is a guide plane, a curved guide surface, or a combination of the guide plane and the curved guide surface.

Herein, when the distal accommodation side wall is or partially is the guide plane, a third intersection angle $\gamma$ is formed by the distal accommodation side wall and a jaw plane on a sagittal cross section, and $30° \leq \gamma \leq 80°$.

Herein, the mesial accommodation side wall is provided with a stabilizing surface having a tilt angle configured to allow the mandible to stably occlude within the accommodation space.

Herein, the stabilizing surface is a plane stabilizing surface, a curved stabilizing surface, or a combination of the plane stabilizing surface and the curved stabilizing surface.

Herein, when the distal accommodation side wall is or partially is the guide plane, the tilt angle is a fourth intersection angle $\delta$ formed by the mesial accommodation side wall and a jaw plane on a sagittal cross section, and $30° \leq \delta \leq 80°$.

Herein, the shell-like body has a geometric structure configured to gradually reposition of the maxillary teeth from initial positions to target correction positions.

In a second aspect, some embodiments of the present disclosure further provide an orthodontic system including a plurality of shell-like orthodontic appliances. At least one of the shell-like orthodontic appliances is the shell-like orthodontic appliance according to the first aspect of the present disclosure.

In a third aspect, some embodiments of the present disclosure further provide an orthodontic appliance set including a maxillary orthodontic appliance and a mandibular orthodontic appliance. Herein the maxillary orthodontic appliance is the shell-like orthodontic appliance according to the first aspect of the present disclosure, and the mandibular orthodontic appliance includes a mandibular shell-like body for accommodating mandibular teeth.

In a fourth aspect, some embodiments of the present disclosure further provide an orthodontic system including a plurality of orthodontic appliance sets that include at least the orthodontic appliance set according to the orthodontic appliance sets described in the third aspect. The plurality of orthodontic appliance sets have a geometric shape configured to adjust positions of teeth in the mandibular anterior region relative to a maxilla upward to target positions in a sagittal direction, while to gradually reposition of the teeth from an initial positions to the target positions.

In a fifth aspect, some embodiments of the present disclosure further provide a design method for the shell-like orthodontic appliance, including:

- obtaining a digital dental model including a digital dental model body; and
- designing, based on the digital dental model, the shell-like orthodontic appliance according to the first aspect of the present disclosure; and
  - a designed shell-like orthodontic appliance includes a shell-like body designed based on the digital dental model body and a sagittal adjustment portion at least partially connected to a lingual side of the shell-like body; and
  - the sagittal adjustment portion is designed having a geometric structure configured to stabilize a maxillomandibular occlusion relationship and reduce a deformation of the shell-like body caused by occlusion while to adjust positions of the teeth in the mandibular anterior region relative to the maxilla upward to the target occlusion positions.

In a sixth aspect, some embodiments of the present disclosure further provide a manufacturing method for the shell-like orthodontic appliance. Herein, the orthodontic appliance designed based on the design method according to the fifth aspect of the present disclosure is manufactured. The manufacturing method includes a manufacturing method of thermoforming and then cutting or a manufacturing method of direct 3D-printing.

Compared with the existing technologies, the present disclosure has following advantages.

In the shell-like orthodontic appliance provided in the present disclosure, the sagittal adjustment portion is provided at the lingual side in the anterior region of the shell-like body, so as to adjust a maxillomandibular position relationship while to at least partially offset deformation of the shell-like body caused by occlusion. During a maxillomandibular interaction, the sagittal adjustment portion contacts the mandible. The sagittal adjustment portion has a geometric structure configured to stabilize the maxillomandibular occlusion relationship and reduce a deformation of the shell-like body caused by occlusion while to adjust positions of the teeth in the mandibular anterior region relative to the maxilla upward to target occlusion positions in the sagittal direction. An invisible orthodontic appliance is used to adjust positions of teeth in the mandibular anterior region in the sagittal direction while reduce deformation of the shell-like orthodontic appliance caused by occlusion.

The orthodontic appliance set provided in the present disclosure includes the maxillary orthodontic appliance and the mandibular orthodontic appliance. Herein, the maxillary orthodontic appliance is the shell-like orthodontic appliance having a sagittal adjustment portion. The mandibular orthodontic appliance is the mandibular shell-like body accommodating mandibular teeth. Maxillary and mandibular teeth may be corrected synchronously. For a patient having a deep mandibular spee curve, the anterior teeth may be pressed down or the posterior teeth may be pulled up to perform leveling of the spee curve. In this way, when performing maxillomandibular position relationship adjustment, the maxillary and mandibular teeth are being corrected, and orthopedic and orthodontic treatments are performed synchronously.

Besides, the orthodontic system provided in the present disclosure has a geometric structure composed of a series of shell-like orthodontic appliances having a sagittal adjustment portion, and the geometric structure is configured to gradually relocate teeth from initial positions to target positions. The orthodontic system is further able to adjust relative positions of teeth in the mandibular anterior region relative to the maxilla in the sagittal direction. The orthodontic system provided in the present disclosure may be composed of a series of orthodontic appliance sets synchronously wearable by both a maxilla and a mandible. While performing maxillomandibular position relationship adjustment, the maxillary and mandibular teeth may be gradually relocated from the initial positions to the target positions.

DETAILED DESCRIPTION OF THE EMBODIMENTS

In order to make the purpose, technical solutions and advantages of the present disclosure clearer, the technical solutions in the embodiments of the present disclosure will be clearly and completely described below with reference to the accompanying drawings of the present disclosure. Obviously, described embodiments are merely some rather than all embodiments of the present disclosure. Based on the embodiments in the present disclosure, all other embodiments obtained by those of ordinary skill in the art without inventive work fall within the protection scope of the present disclosure. Unless otherwise defined, technical or scientific terms used herein shall have ordinary meanings as understood by those of ordinary skills in the field to which the present disclosure belongs. As used herein, “include”, “including” and similar words mean that the elements or things appearing before the word encompass the elements or things recited after the word and their equivalents, but do not exclude other elements or things.

For a deep overbite case, a general teeth correction treatment is to use a maxillary removable orthodontic appliance to maintain a height of an anterior alveolarbone unchanged during an orthodontic procedure. Emphasis is on rising of height of posterior teeth. Grinding pads are adjusted one by one from a last tooth, so that paired teeth are elongated to contact each other. After the posterior teeth rise, correction on lingual malposition of the anterior teeth and distal posterior teeth are performed. Alternatively, an horizontal guide may be provided at a lingual side in the maxillary anterior region. However, this method demands a horizontal guide made of metal and resin to be fixed on the maxillary. This not only causes suspension of some teeth but also affects chewing of a patient wearing the appliance. The patient may have a strong sense of a foreign matter. In the present disclosure, a sagittal adjustment portion is provided on a shell-like orthodontic appliance. A sagittal adjustment portion is configured to adjust positions of teeth in the mandibular anterior region relative to the maxilla upward to target occlusion positions in a sagittal direction. This at least is able to partially offset deformation of the shell-like body caused by occlusion. Besides, a sense of a foreign matter in a mouth is weakened and the patient feels more comfortable.

Embodiments

Figures 1, 2:
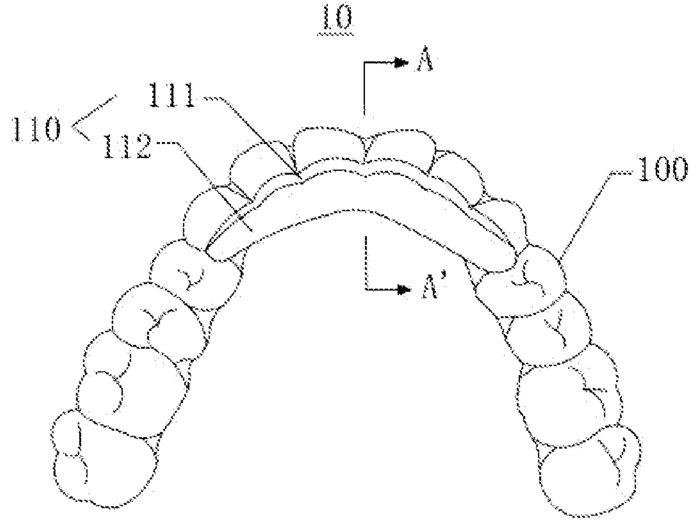
FIG. 1 is a structural diagram of a shell-like orthodontic appliance 10 according to an embodiment of the present disclosure.
FIG. 2 is a flow chart of a design method for a shell-like orthodontic appliance according to an embodiment of the present disclosure.

FIG. 1 shows a shell-like orthodontic appliance 10 according to an embodiment of the present disclosure. The shell-like orthodontic appliance 10 is configured to adjust a maxillomandibular position relationship while at least to partially offset deformation of the shell-like body caused by occlusion. Specifically, the shell-like orthodontic appliance 10 includes a shell-like body 100 provided with a cavity accommodating a plurality of teeth. Further, a sagittal adjustment portion 110 is provided on the shell-like body 100. The sagittal adjustment portion 110 is configured to adjust a maxillomandibular position relationship while at least to partially offset deformation of the shell-like body caused by occlusion. The sagittal adjustment portion 110 is at least partially connected to the lingual side in the anterior region of the shell-like body 100. During a maxillomandibular interaction, the sagittal adjustment portion 110 contacts a mandible. The sagittal adjustment portion 110 has a geometric structure configured to stabilize a maxillomandibular occlusion relationship and reduce a deformation of the shell-like body 100 caused by occlusion while to adjust positions of teeth in a mandibular anterior region relative to the maxilla upward to target occlusion positions in the sagittal direction.

In an embodiment of the present disclosure, a design method for the shell-like orthodontic appliance 10 is provided. As shown in FIG. 2, the designing method includes the following operations:

S1: obtaining a digital dental model including a digital dental model body; and

S2: designing, based on the digital dental model, the shell-like orthodontic appliance 10, the shell-like orthodontic appliance 10 including a designed shell-like body 100 based on the digital dental model body and a sagittal adjustment portion 110 at least partially connected to the lingual side of the shell-like body 100, the sagittal adjustment portion 100 is designed having a geometric structure configured to stabilize a maxillomandibular occlusion relationship and reduce a deformation of the shell-like body caused by occlusion while to adjust positions of teeth in a mandibular anterior region relative to a maxilla upward to target occlusion position in a sagittal direction.

The shell-like body 100 may be provided as having several cavities accommodating a plurality of teeth, and is divided into an anterior region and a posterior region. Herein, the "posterior region" is defined according to classification of teeth on pages 36-38 of the 2nd edition of "Introduction of Stomatology" published by the Peking University Medical Press. The posterior region includes premolars and molars, that is, teeth 4 to 8 as indicated by using an International Dental Federation (FDI) marking method. The anterior region includes teeth 1 to 3 as indicated by using the FDI marking method. The anterior region in the shell-like body 100 is configured to accommodate central incisors, lateral incisors and canines of the maxillary teeth. The posterior region in the shell-like body 100 is configured to accommodate first premolars, second premolars, first molars, second molars and third molars of the maxillary teeth. The shell-like body 100 is provided with several cavities accommodating a plurality of teeth, and is divided into a lingual surface, a labial surface, a mesial surface and a distal surface. Herein, the "lingual surface" is named according to names of surfaces of a dental crown on pages 35-36 of the 2nd edition of "Introduction of Stomatology" published by the Peking University Medical Press. Herein, a surface of a dental crown in the anterior region close to lips is named the labial surface, a surface of the dental crown in the posterior region close to cheeks is named a buccal surface. A surface of the dental crown in both the anterior and posterior regions close to tongue is named a lingual surface. The mesial surface and the distal surface are two surfaces of the dental crown adjacent to adjacent teeth, and are unified as proximal surfaces. A surface of the dental crown close to a middle line of a face is named the mesial surface and a surface of the dental crown away from the middle line of the face is named the distal surface.

Figure 6:
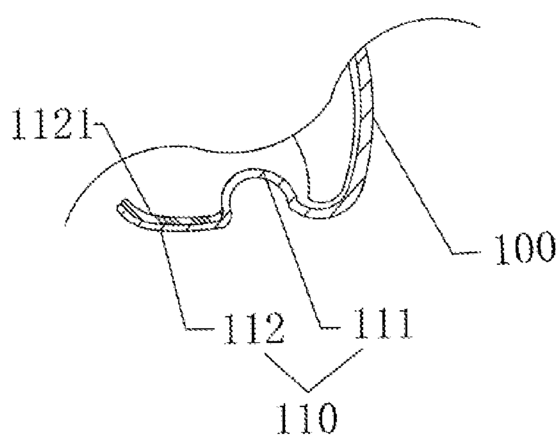
FIG. 6 is a partial sectional view of a shell-like orthodontic appliance having a multi-layered first reinforcing portion according to an embodiment of the present disclosure.
Figure 7:
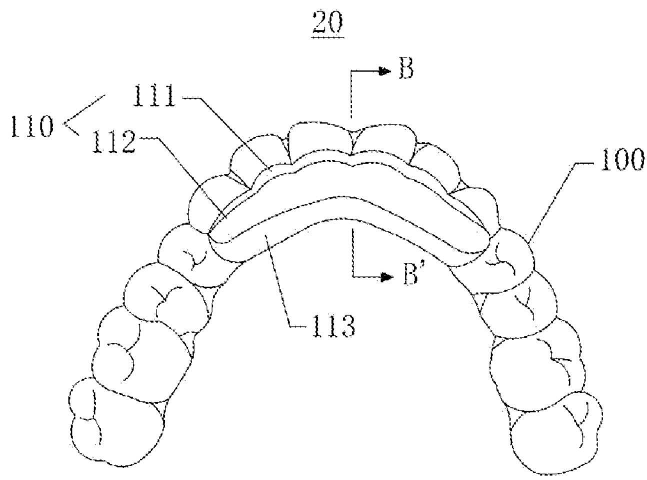
FIG. 7 is a structural diagram of a shell-like orthodontic appliance 20 according to an embodiment of the present disclosure.
Figure 8:
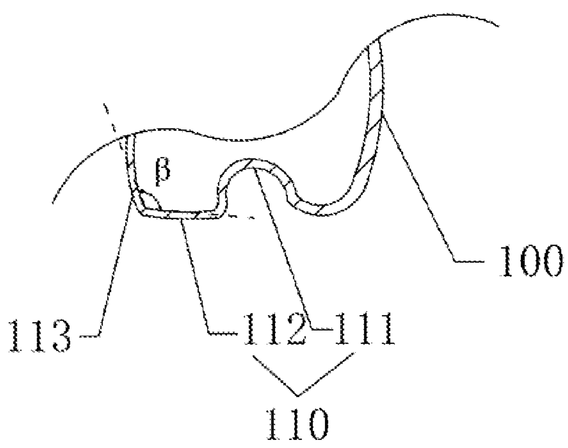
FIG. 8 is a partial sectional view in a B-B' direction in FIG. 7.

In FIGS. 6-8 and the description on surfaces of the dental crown on page 44 in the $2^{nd}$ edition of "Tooth Anatomy and Oral Physiology" an "incisal edge" is a portion having a biting function in an anterior teeth form. The anterior teeth protrude off round protuberance on the lingual surface to form ridges named "incisal ridges". The anterior teeth on the labial surface are generally smooth and are named "incisal edges". "Toothtrisection" is defined on page 43. In order to clarify a position of a certain portion on surfaces of the teeth, the surfaces of the dental crown and a tooth root are generally divided into three equal portions. For example, the lingual surface may be divided into a mesial ⅓, a middle ⅓ and a distal ⅓. A proximal surface may be divided into a cheek ⅓, a middle ⅓ and a lingual ⅓. The labial surface may be divided into an incisal ⅓, a middle ⅓ and a neck ⅓. Posterior teeth are divided into a jaw ⅓, a middle ⅓ and a neck ⅓.

In an embodiment of the present disclosure, the shell-like body 100 may further adjust to gradually relocate the plurality of teeth from the initial positions to target correction positions. Herein, the initial positions of the teeth may be initial positions of the teeth to be corrected, or positions before any correction during the orthodontic procedure. The target correction positions of the teeth may be any positions closer to the target correction positions than the initial positions.

Figure 3:
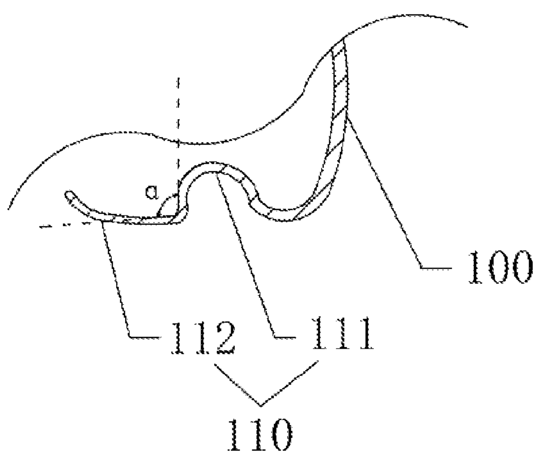
FIG. 3 is a partial sectional view in an A-A' direction in FIG. 1.

In an embodiment in the present disclosure, as shown in FIG. 1 and FIG. 3 (sectional view in an A-A' direction of a sagittal cross section), the sagittal adjustment portion 110 includes a side wall of an accommodation space 111 formed by extending and bending of the lingual side in the anterior region of the shell-like body 100. The accommodation space 111 at least accommodates an incisal edge of the teeth in the mandibular anterior region or a portion adjacent to the incisal edge. The sagittal adjustment portion 110 further includes a first reinforcing portion 112 configured at least to partially offset deformation of the shell-like body caused by occlusion. An end of the first reinforcing portion 112 is connected to an end of the side wall away from the shell-like body 100. More specifically, the lingual side in the anterior region of the shell-like body 100 bends and extends towards a side away from teeth in the maxillary anterior region. The side wall of the accommodation space 111 formed by extending and bending may either be a smooth transiting curved surface or be an extending surface enclosed by a polygon. In other words, a portion of the accommodation space 111 adjacent to the teeth in the maxillary anterior region is connected to the lingual side of the anterior region of the shell-like body 100. A portion of the accommodation space 111 away from the teeth in the maxillary anterior region is connected to the first reinforcing portion 112. Herein, a particular position of connection between the accommodation space 111 and the lingual side in the anterior region of the shell-like body 100 may be a portion adjacent to a gingival edge at the lingual side in the anterior region of the shell-like body 100, or a portion adjacent to a lingual fossa accommodating the teeth in the anterior region of the shell-like body 100. Specifically, the connection may start from the gingival edge at the lingual side in the anterior region of the shell-like body 100 till a position accommodating ¼-½ a length of the dental crown in the anterior region. That is, the connection is not the gingival edge at the lingual side in the anterior region of the shell-like body 100, but the connection extends start from a portion adjacent to the gingival edge at the lingual side in the anterior region of the shell-like body 100, or a portion adjacent to the lingual fossa accommodating the teeth in the anterior region of the shell-like body 100, till a side away from the teeth in maxillary the anterior region. The accommodation space 111 at least accommodates the incisal edge of the teeth in the mandibular anterior region or the portion adjacent to the incisal edge. More specifically, "overbite" refers to a vertical distance the maxillary teeth over the mandibular teeth. Generally, the vertical distance is 1 to 3 mm. In anterior teeth, it is a normal overbite if the overbite does not exceed ⅓ of an incisor labia surface. It is a deep overbite if the overbite exceeds ⅓ of the incisor labia surface. A degree of the overbite is determined by a position where an incisal edge of mandibular incisal teeth bites on a lingual surface of maxillary incisal teeth. It is a normal overbite if the incisal edge of the mandibular incisal teeth bites on ⅓ of the lingual surface of the maxillary incisal teeth. It is a I-degree overbite if the incisal edge of the mandibular incisal teeth is within ⅓ of the lingual surface of the maxillary incisal teeth. It is a II-degree overbite if the incisal edge of the mandibular incisal teeth is within ⅓ of a dental neck. It is a III-degree overbite if the incisal edge of the mandibular incisal teeth is over ⅓ of the dental neck. That the accommodation space 111 accommodates the incisal edge of the teeth in the mandibular anterior region or the portion adjacent to the incisal edge may include the following conditions: 1) the incisal edge is ⅓ of the labial surface of the mandibular anterior region, 2) A portion adjacent to the incisal edge is close to ⅓ of the labial surface of the mandibular anterior region, for example between ¼ and ⅓ or between ⅓ and ½, and preferably, ¼-⅓. At this time, the vertical distance of the maxillary teeth over the mandibular teeth does not exceed ⅓ of the incisor labia surface of the mandibular.

Figure 4:
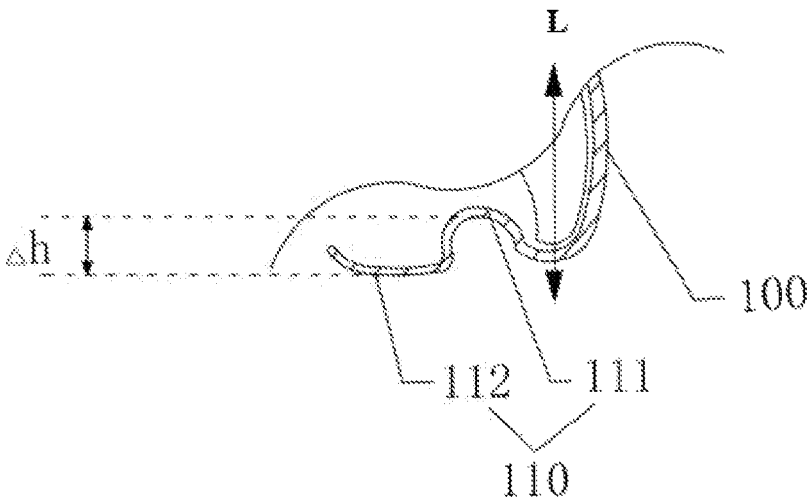
FIG. 4 is a partial sectional view of a height difference between an accommodation space and a first reinforcing portion in the A-A' direction in FIG. 1, L denotes a tooth long axis direction.
Figure 5:
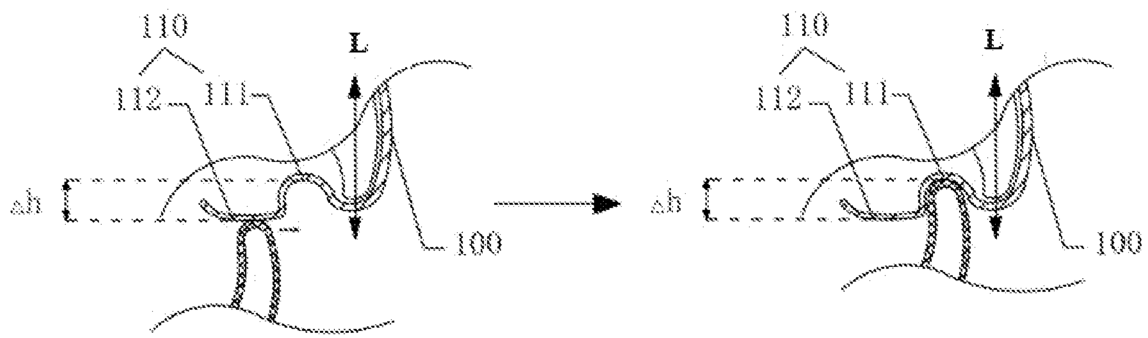
FIG. 5 is a schematic diagram of a movement tendency of maxillomandibular interaction according to an embodiment of the present disclosure. L denotes a tooth long axis direction.

In an embodiment in the present disclosure, as shown in FIG. 4 and FIG. 5, in a long axis direction of the teeth on a sagittal cross section, a region of the first reinforcing portion 112 contacting a mandible is more adjacent to an incisal edge in the maxillary anterior region as compared with a region of the accommodation space 111 contacting the mandible. That is, there is a height difference $\Delta h$ between the region of the first reinforcing portion 112 contacting the mandible and the region of the accommodation space 111 contacting the mandible. For a deep-overbite patient, after wearing the shell-like orthodontic appliance 10, as shown in FIG. 5, the teeth in the mandibular anterior region contact the first reinforcing portion 112 first. Then along with occlusion actions of the maxilla and the mandible, the incisal edge of the teeth in the mandibular anterior region enter the accommodation space 111, i.e., to contact the accommodation space 111. Besides, a position where the teeth in the mandibular anterior region finally stably contact the maxilla is a most distant position of the accommodation space 111 away from an incisal ridge of the teeth in the maxillary anterior region. The height difference $\Delta h$ may enable the incisal edge of the teeth in the mandibular anterior region to be accommodated within the accommodation space 111. The positions of the teeth in the mandibular anterior region are adjusted relative to the maxilla upward to the target occlusion positions in the sagittal direction. The target occlusion positions are positions where the vertical distance of the maxillary teeth over the mandibular teeth does not exceed ⅓ the mandibular incisor labia surface.

In an embodiment of the present disclosure, as shown in FIG. 3, on the sagittal cross section, a first intersection angle $\alpha$ is formed at a connection between the first reinforcing portion 112 and a free end of a side wall of the accommodation space 111, and $90° \leq \alpha \leq 160°$. Particularly, one of forms may be that the first intersection angle $\alpha$ is 90°. At this time, the first reinforcing portion 112 and the free end of the side wall of the accommodation space 111 are vertical to each other. Alternatively, the intersection angle may be any angle greater than 90° and less than or equal to 160°. That is, the first intersection angle $\alpha$ formed through connection between the first reinforcing portion 112 and the side wall of the accommodation space 111 is an obtuse angle. The first angle falls into the range of $90° \leq \alpha \leq 160°$. The first reinforcing portion 112 extends along a side away from the teeth in the maxillary anterior region. At this time, if the first reinforcing portion 112 contacts the mandible, a guide surface guiding the mandible sliding into the accommodation space 111 may be formed. When the maxillary and the mandible interact each other, the mandible tends to move in a direction of the target occlusion position in the sagittal direction relative to the maxillary position.

In an embodiment of the present disclosure, a connection between the first reinforcing portion 112 and the shell-like body 100 is a smooth transiting curved surface. More specifically, the connection between a free end of the first reinforcing portion 112 extending in a distal direction and the shell-like body 100 is a smooth transiting curved surface. In this way, it makes there is a transiting curved surface at the connection between the free end of the first reinforcing portion 112 extending in the distal direction and the shell-like body 100. A side of the first reinforcing portion 112 adjacent to the teeth in the maxillary anterior region is connected to a side of the accommodation space 111. At this time, the side of the first reinforcing portion 112 adjacent to the teeth in the maxillary anterior region is an end in the mesial direction. The free end of first reinforcing portion 112 extending in the distal direction is the side adjacent to the teeth in the maxillary anterior region relative to the first reinforcing portion 112 is a side extending in a direction opposite to the end in the mesial direction. The free end of the first reinforcing portion 112 extending in the distal direction may be a free end crossing the anterior region at both left and right sides of the shell-like body 100 for connection. The connection between the free end and the left and right sides of the shell-like body 100 is a smooth transiting curved surface. In this way, the surface of the shell-like orthodontic appliance 10 contacting an oral cavity is mellow or smooth. This causes a weaker sense of a foreign matter to a patient, and is more comfortable for the patient wearing it. In an example, the first reinforcing portion 112 extends in the distal direction from the anterior region of the shell-like body 100 along the free end of the side wall of the accommodation space 111. The connection between the first reinforcing portion 112 and a cavity accommodating a first premolar at both left and right sides of the shell-like body 100 is a smooth transiting curved surface. More specifically, the connection between the first reinforcing portion 112 and a distal surface of the cavity accommodating the first premolar at both left and right sides of the shell-like body 100 is a smooth transiting curved surface. That is, the connection between the first reinforcing portion 112 and both the left and right sides of the shell-like body 100 is a connection starting from the mesial surface of the cavity accommodating the first premolar. More specifically, the first premolar has a buccal cusp and a lingual cusp on an occlusion surface, while a canine tooth has only a cusp on the occlusion surface. Therefore, during a smooth transition, a connection width (i.e., a mesial-distal width of the first reinforcing portion 112 in the sagittal direction) of the connection between the first reinforcing portion 112 and the shell-like body 100 may partially solve the problem of non-smooth connection caused by difference between the canine tooth and the first premolar in terms of occlusion surfaces. That is, the first reinforcing portion 112 is connected to the mesial surface of the shell-like body 100 accommodating the first premolar, to till a canine region or partial accommodation compensation of the anterior occlusion surface, so as to achieve smooth transition of the connection.

In an embodiment of the present disclosure, on the sagittal cross section, the first reinforcing portion 112 has a width of 2 to 5 mm in a mesial-distal direction. The width may make the mandible contact the first reinforcing portion 112 first when the mandible contacts the maxilla, so as to guide the mandible into the accommodation space 111, and the mandible tends to move in a direction of the target occlusion position in the sagittal direction relative to the maxillary position. Besides, the width makes a small width of the sagittal adjustment portion 110 covering the maxillary. This not only weakens the sense of a foreign matter in the dental cavity for the patient but also facilitates manufacturing of the shell-like orthodontic appliance 10. This reduces use of palate information of the maxilla. When information is being collected in the patient's dental cavity, a traditional intraoral model acquisition method may be applied. Then scanning may be performed to acquire corresponding digital information. Alternatively, an intraoral scanner may be applied to acquire intraoral information. In the two acquisition methods, designing and manufacturing of a corresponding product may be completed by using only information of the maxillary teeth and partial gingival information.

In an embodiment of the present disclosure, as shown in FIG. 1, a side of the first reinforcing portion 112 away from the teeth in the maxillary anterior region generally anastomoses a curve radian of teeth in an anterior region. Specifically, general anastomosis includes that the side of the first reinforcing portion away from the teeth in the maxillary anterior region has a curve radian consistent with a curve radian of the teeth in the anterior region, that the side of the first reinforcing portion away from the teeth in the maxillary anterior region has a curve radian similar to the curve radian of the teeth in the anterior region, and that a variation range of a similar curve radian is ±10°. This ensures that the side of the first reinforcing portion away from the teeth in the maxillary anterior region has a concave bending form in a incisor direction as similar to that of the teeth in the anterior region. This provision reserves a relatively great accommodating space for the tongue when the patient is wearing the appliance, and results in a weaker sense of a foreign matter when performing maxillomandibular relationship adjustment.

In an embodiment in the present disclosure, the first reinforcing portion 112 has an elastic modulus greater than an elastic modulus of the shell-like body 100. The first reinforcing portion 112 has a great elastic modulus, so as to at least partially offset deformation of the shell-like body 100 caused by occlusion. Herein, when performing maxillomandibular occlusion, the mandible first contacts the first reinforcing portion 112. At this time, the first reinforcing portion 112 demands a strength sufficient for supporting an occlusion force generated. Therefore, the first reinforcing portion 112 has an elastic modulus greater than an elastic modulus of the shell-like body 100. Besides, the elastic modulus of the shell-like body 100 is small, so that it is more comfortable for the patient wearing the appliance. It shall be noted that the shell-like body 100 may have a geometric structure that causes a relative displacement to the teeth it accommodates, or the shell-like body 100 may only have a function of accommodating the teeth. In an example of the present disclosure, a hardness of the first reinforcing portion 112 is greater than a hardness of the shell-like body 100. For example, the first reinforcing portion 112 has a Shore hardness of 65D to 80D including but not limited to that the Shore hardness of the first reinforcing portion 112 is any one of 65D, 70D, 75D, 80D or any other value within the range, or any two points are within a scope of apexes of the range. For example, the Shore hardness of the shell-like body 100 is 50D to 75D, including but not limited to that the Shore hardness of the shell-like body 100 is any one of 50D, 55D, 60D, 65D, 70D, 75D or any other value within the range, or any two points are within a scope of apexes of the range. The provision, when performing maxillomandibular occlusion, may enable the first reinforcing portion 112 sufficient to generate an occlusal force for supporting and contacting the mandible, so as to reduce an occlusion deformation caused by the first reinforcing portion 112 and the shell-like body 100, In another embodiment of the present disclosure, as shown in FIG. 6, the first reinforcing portion 112 has a multi-layered structure. At least one reinforcing layer 1121 at least partially covers a basic layer. Herein, the basic layer and a reinforcing layer 1121 may be of the same material or varied materials. The basic layer may be of the same material as the shell-like body 100 and/or the accommodation space 111. Alternatively, the basic layer, the shell-like body 100 and the accommodation space 111 are integrally formed. Preferably, an elastic modulus of the reinforcing layer 1121 is greater than an elastic modulus of the basic layer. That is, the reinforcing layer 1121 is able to have, when performing maxillomandibular occlusion, a function of preventing an occlusion force generated from deforming the shell-like body 100. In this embodiment, a thickness of the first reinforcing portion 112 is 0.7 to 2.0 mm, including but not limited to any one of 0.7 mm, 1.0 mm, 1.5 mm, 2.0 mm or any other value within the range, or any two values are within a scope of apexes of the range. A thickness of the shell-like body 100 is 0.5 to 1.0 mm, including but not limited to any one of 0.5 mm, 0.6 mm, 0.7 mm, 0.8 mm, 0.9 mm or 1.0 mm or any other value within the range, or any two values are within a scope of apexes of the range. In the range, the multi-layered structure forms the first reinforcing portion 112 having an entire thickness greater than a thickness of the shell-like body 100. This ensures that the first reinforcing portion 112 has a strength sufficient for supporting the occlusion force generated, and the interaction between the teeth and the shell-like body 100 accommodating the teeth makes it more comfortable for the patient wearing the appliance.

In an embodiment of the present disclosure, the first reinforcing portion 112 and the shelf-like body 100 are of the same material. For example, the material may be one of PETG, PC or TPU, or may be another macromolecule material safe for use in medical instrument and used in the oral cavity, so as to have an effect of correcting teeth during safe wearing. In another embodiment of the present disclosure, the first reinforcing portion 112 and the shell-like body 100 are respectively single materials of varied types or multi-layered composites of varied types. More specifically, when the first reinforcing portion 112 and the shell-like body 100 are single materials of varied types, they may be any two of PETG, PC or TPU. Herein, varied materials may be selected when designing or manufacturing the first reinforcing portion 112 and the shell-like body 100. For example, a material for the shell-like body 100 is TPU, a material for the first reinforcing portion 112 may be PETG. At this time, a film used may be manufactured through thermoforming with partial regions made of varied materials. Alternatively, varied materials may be used for varied partial regions upon 3D-printing. When the first reinforcing portion 112 is a multi-layered composite of a type different from that of the shell-like body 100, the first reinforcing portion 112 may be a multi-layered composite formed through random combination of PETG, PC or TPU. For example, the first reinforcing portion 112 may be a multi-layered composite while the shell-like body 100 is a single material. Alternatively, the first reinforcing portion 112 may be a single material while the shell-like body 100 is a multi-layered composite. Further, both the first reinforcing portion 112 and the shell-like body 100 are multi-layered composites. More specifically, the first reinforcing portion 112 is a multi-layered composite different from that of the shell-like body 100. For example, the shell-like body 100 is a single-layer structure or a multi-layered composite while the first reinforcing portion 112 is a multi-layered composite. Herein, one of the layers of the multi-layered structure of the first reinforcing portion 112 may be the same or different from that of the shell-like body 100. For example, the first reinforcing portion 112 may be a double-layered composite, PETG and TPU, to be exactly, while the material of the shell-like body 100 may be PETG. For another example, the first reinforcing portion 112 may be a double-layered composite, PETG and TPU, to be exactly, while the shell-like body 100 is composed of a double-layered composite, PETG and PC, to be exactly. These examples are only some preferable embodiments. All material combinations capable of achieving the effect of the present disclosure fall into the protection scope of the present disclosure, which is not further exemplified herein.

Figure 9:
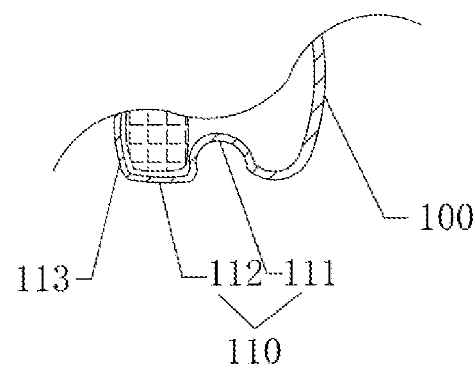
FIG. 9 is a partial sectional view of a shell-like orthodontic appliance having a reinforcing block according to an embodiment of the present disclosure.
Figure 10:
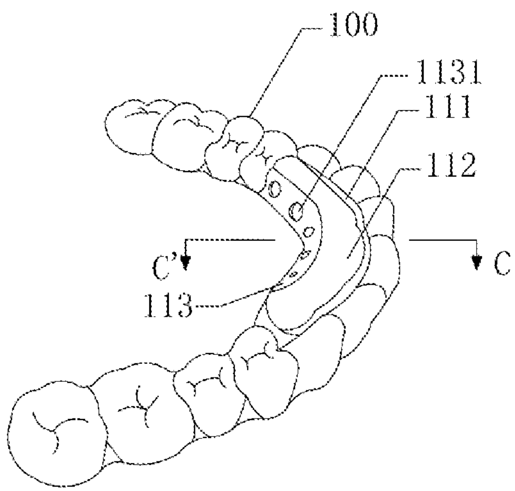
FIG. 10 is a structural diagram of a shell-like orthodontic appliance 30 according to an embodiment of the present disclosure.
Figure 11:
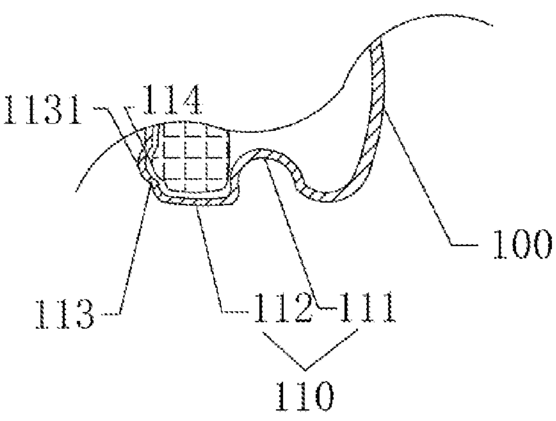
FIG. 11 is a partial sectional view in a C-C' direction in FIG. 10.

In an embodiment of the present disclosure, as shown in FIG. 7 and FIG. 8 (the sagittal cross section is a cross section along B-B'), a second reinforcing portion 113 is provided at an end of a first reinforcing portion 112 of a shell-like orthodontic appliance 20 extending in a distal direction. The first reinforcing portion 112 and the second reinforcing portion 113 enclose to form an accommodating space. The first reinforcing portion 112 and the second reinforcing portion 113 are provided with a second intersection angle. The first reinforcing portion 112 extends in the distal direction along the sagittal cross section, while the second reinforcing portion 113 extends in a direction forming the second intersection angle with the first reinforcing portion 112. That is, the first reinforcing portion 112 and the second reinforcing portion 113 extend in varied directions. In a preferable embodiment, the second intersection angle is β, and 90°≤β<180°. In this way, the second reinforcing portion 113 is a plane or a curved structure having a radian, and the first reinforcing portion 112 is a plane or a curved structure having a radian. Herein, when both the first reinforcing portion 112 and the second reinforcing portion 113 are planes, the intersection angle of the first reinforcing portion 112 and the second reinforcing portion 113 is a second intersection angle formed by extending of the first reinforcing portion 112 and the second reinforcing portion 113. When the first reinforcing portion 112 and the second reinforcing portion 113 are curved surfaces having radians, the intersection angle of the first reinforcing portion 112 and the second reinforcing portion 113 is a second intersection angle formed by tangents in directions of connection points extending. When one of the first reinforcing portion 112 and the second reinforcing portion 113 is a curved surface having a radian while the other one is a plane, the intersection angle is a second intersection angle formed by an extending direction of the plane and a direction of a tangent at a connection of the curved surface and the plane. The second angle β has a value range of 90°≤β<180°. In this provision, when the second intersection angle β is 90°, i.e. the parts of the first reinforcing portion 112 and the second reinforcing portion 113 are vertical, during maxillomandibular occlusion actions, the teeth in the mandibular anterior region gradually slide into the accommodation space 111 from a region where the teeth in the mandibular anterior region contact the first reinforcing portion 112, and the second reinforcing portion 113 and the first reinforcing portion 112 enclose to form an accommodating space. In the sagittal cross section direction, the second reinforcing portion 113 provides a direct acting force in the long axis direction of the teeth or an acting force disintegrated in this direction, enhancing a support function of the first reinforcing portion 112 during maxillomandibular occlusion and helping partially offset deformation of the shell-like body caused by occlusion. In order to provide a stronger support, in some preferable embodiments, as shown in FIG. 9 to FIG. 11 (the sagittal cross section is a cross section along C-C'), an accommodating space formed is further provided with a reinforcing block 114. The reinforcing block 114 may be a reinforcing block used for medical appliance intraoral use materials, for example, the reinforcing block may be formed by filling medical polymer resin or be a pre-molded polymer material structure. In order to achieve a stable relationship of the reinforcing block 114 within the accommodating space, the reinforcing block 114 and the second reinforcing portion 113 are provided with a matching male-female structure. As shown in FIG. 10 and FIG. 11, in a preferable embodiment, a second reinforcing portion 113 of a shell-like orthodontic appliance 30 is provided with a convex blister 1131 protruding in a distal direction, and a convex portion matching the convex blister 1131 is provided at the convex blister 1131 corresponding to a region of the reinforcing block 114 contacting the second reinforcing portion 113. The matching of the two results in that the reinforcing block 114 is stably placed within the accommodating space formed by the first reinforcing portion 112 and the second reinforcing portion 113. This may avoid ingestion of the reinforcing block 114 by the patient by mistake due to instable combination of the two, and avoids unnecessary medical accidents. The concave-convex matching is only a preferable example. All other structures capable of ensuring stability of the second reinforcing portion 113 and the reinforcing block 114 fall into the protection scope of the present disclosure, which is not further exemplified herein.

Figure 12:
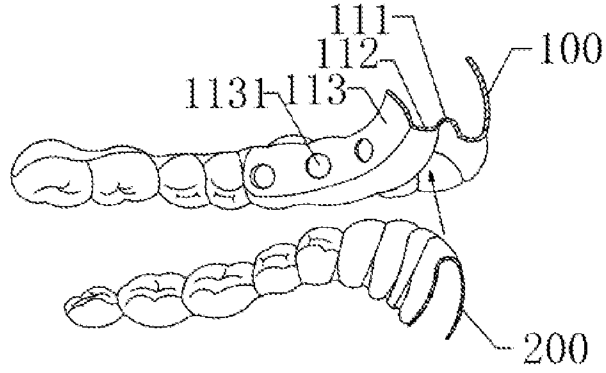
FIG. 12 is a schematic diagram of a movement tendency of maxillomandibular interaction with an orthodontic appliance set according to an embodiment of the present disclosure.

In an embodiment of the present disclosure, the accommodation space 111 is a structure continuously distributed or partially continuously distributed at a lingual side of the teeth in the maxillary anterior region and concaved in a palate direction. Such concaved structure is able to effectively accommodate at least some teeth in the maxillary anterior region, thereby adjusting positions of the teeth in the mandibular anterior region relative to the maxilla upward to the target occlusion positions in the sagittal direction. In addition, when the accommodation space 111 is a structure continuously distributed at the lingual side of the teeth in the maxillary anterior region and concaved in the palate direction, as shown in FIG. 12, the concaved structure formed by the accommodation space 111 may be deemed as a continuous ridge structure configured to reduce deformation of the shell-like body 100 in a buccal lingual side direction or in a sagittal direction. More specifically, during maxillomandibular occlusion, when the teeth in the mandibular anterior region contact the shell-like orthodontic appliance, the teeth in the mandibular anterior region functions on the first reinforcing portion 112 of the shell-like orthodontic appliance and then enters target positions, i.e., the accommodation space 111. At this time, the mandible generates an occlusion force towards the palate. When the strength of the first reinforcing portion 112 or the accommodation space 111 contacting the mandible is small, the shell-like body 100 may generate sagittal deformation. For example, a stretch at the lingual side in the anterior region of the shell-like body 100 may indirectly cause the shell-like body 100 corresponding to the teeth in the anterior region to generate a pressing-down effect. In another condition, deformation at a buccal lingual side may be generated. For example, when the mandible and the first reinforcing portion 112 contact each other, the shell-like body 100 generates a sagittal deformation while possibly moving both sides accommodating the teeth in the posterior region of the shell-like body 100 to the lingual side. Correspondingly, an unexpected tilt to the tongue or an unexpected dental arch contraction may occur to the teeth accommodated. When the accommodation space 111 is a structure partially continuously distributed at the lingual side of the teeth in the maxillary anterior region and concaved in a gingival direction, the accommodation space 111 may be a plurality of structures dispersed at the lingual side of the teeth in the maxillary anterior region and concaved in the gingival direction. A concaved structure as such is configured to accommodate at least partial region (e.g., a region adjacent to the incisal edge) of the teeth in the mandibular anterior region. For example, the accommodation space 111 may be dispersely provided, respectively accommodating six concaved structures including two central incisors, two lateral incisors and two canines. The six concaved structures match corresponding mandibular teeth or an orthodontic appliance accommodating the corresponding mandibular teeth. In a preferable example, a concaved structure is an arch. When the arch contacts the teeth in the mandibular anterior region, the arch accommodates a part of the teeth in the mandibular anterior region adjacent to the incisal edge. At this time, the teeth in the mandibular anterior region are adjusted relative to the maxilla upward to target occlusion positions in the sagittal direction. That is, the vertical distance of the maxillary teeth over the mandibular teeth does not exceed ⅓ of the mandibular incisor labia surface, and the maxillary teeth match mandibular target occlusion positions. More specifically, the accommodation space 111 has a height difference Δh in a long axis direction of the teeth on the sagittal cross section, the height difference being ¼-½ of a length of a dental crown in the long axis direction of the teeth in the mandibular anterior region. At this time, a design may be correspondingly performed according to the target correction positions of the patient, so that when the mandible occludes to final target correction positions, the vertical distance of the maxillary teeth over the mandibular teeth does not exceed ⅓ of the mandibular incisor labia surface. In this way, correction of the deep overbite is achieved. In another embodiment, the accommodation space 111 has a width of 1.5 to 4.0 mm in a mesial-distal direction on the sagittal cross section. The width range matches the width of the sagittal cross section corresponding to the teeth in the mandibular anterior region in the mesial-distal direction. That is, the width range is able to well accommodate the corresponding width of the teeth in the mandibular anterior region, so that the teeth in the mandibular anterior region may be maintained stable in the accommodation space 111. That is, the mandibular target occlusion positions are stable to ensure a maxillomandibular relative location relationship.

In an embodiment of the present disclosure, the accommodation space 111 has an elastic modulus greater than an elastic modulus of the shell-like body 100. Herein, during maxillomandibular occlusion, when the mandible contacts the accommodation space 111 stably contacting the maxilla, the accommodation space 111 demands a strength sufficient for supporting the occlusion force generated. Therefore, the accommodation space 111 has an elastic modulus greater than an elastic modulus of the shell-like body 100. Besides, the elastic modulus of the shell-like body 100 is small, so that it is more comfortable for the patient wearing the appliance. It shall be noted that the shell-like body 100 may have a geometric structure that causes a relative displacement to the teeth it accommodates, or the shell-like body 100 may only have a function of accommodating the teeth. In an embodiment of the present disclosure, a hardness of the accommodation space 111 is greater than a hardness of the shell-like body 100. For example, the accommodation space 111 has a Shore hardness of 65D to 79D including but not limited to that the Shore hardness of the accommodation space 111 is any one of 65D, 70D, 75D, 80D or any other value within the range, or any two points are within a scope of apexes of the range. For example, the Shore hardness of the shell-like body 100 is 50D to 75D, including but not limited to that the Shore hardness of the shell-like body 100 is any one of 50D, 55D, 60D, 65D, 70D, 75D or any other value within the range, or any two points are within a scope of apexes of the range. The provision, when performing maxillomandibular occlusion, may enable the accommodation space 111 to be sufficient to generate an occlusion force generated by supporting and contacting the mandible, so as to reduce an occlusion deformation caused by the accommodation space 111 and the shell-like body 100. In another embodiment of the present disclosure, the accommodation space 111 is a multi-layered structure. The multi-layered structure includes a basic layer and at least one reinforcing layer. Herein, the basic layer and the reinforcing layer may be of the same material or varied materials. The basic layer may be of the same material as the shell-like body 100. Alternatively, the basic layer and the shell-like body 100 are integrally formed. Preferably, an elastic modulus of the reinforcing layer is greater than an elastic modulus of the basic layer. That is, the reinforcing layer is able to have, when performing maxillomandibular occlusion, a function of preventing an occlusion force generated from deforming the shell-like body 100. In this embodiment, a thickness of the accommodation space 111 is 0.7 to 2.0 mm, including but not limited to any one of 0.7 mm, 1.0 mm, 1.5 mm, 2.0 mm or any other value within the range, or any two values are within a scope of apexes of the range. A thickness of the shell-like body 100 is 0.5 to 1.0 mm, including but not limited to any one of 0.5 mm, 0.6 mm, 0.7 mm, 0.8 mm, 0.9 mm or 1.0 mm or any other value within the range, or any two values are within a scope of apexes of the range. In the range, the multi-layered structure forms the accommodation space 111 having an entire thickness greater than a thickness of the shell-like body 100. This ensures that the accommodation space 111 has a strength sufficient for supporting the occlusion force generated, helping partially offset deformation of the shell-like body caused by occlusion. In the mean time, the interaction between the teeth and the shell-like body 100 accommodating the teeth makes it more comfortable for the patient wearing the appliance.

Figure 13:
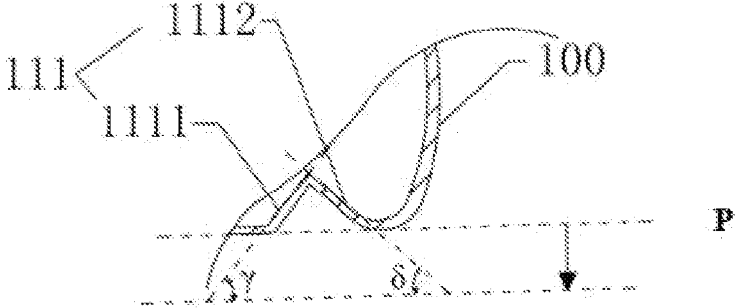
FIG. 13 is a partial sectional view of a shell-like orthodontic appliance having a guide surface according to an embodiment of the present disclosure, P denotes a jaw plane.

In an embodiment of the present disclosure, as shown in FIG. 13, the side wall of the accommodation space 111 includes a mesial accommodation side wall 1112 and a distal accommodation side wall 1111. A side of the mesial accommodation side wall 1112 adjacent to a maxillary incisal edge is at least partially connected to a lingual side in the anterior region of the shell-like body 100. A side of the mesial accommodation side wall 1112 away from the maxillary incisal edge is at least partially connected to an end of the distal accommodation side wall 1111. Another end of the distal accommodation side wall 1111 is at least partially connected to the first reinforcing portion 112. In an embodiment, the side of the mesial accommodation side wall 1112 adjacent to the maxillary incisal edge is continuously connected to the lingual side in the anterior region of the shell-like body 100, enhancing stability of the accommodation space 111 when performing maxillomandibular occlusion. In another embodiment, the side of the mesial accommodation side wall 1112 adjacent to the maxillary incisal edge is partially connected to the lingual side in the anterior region of the shell-like body 100. Specifically, the partial connection may be provided as being separated, forming a separation gap or a separation hole. This provision ensures stability of maxillomandibular occlusion while increasing breathability for the patient wearing the appliance, thereby avoiding bacteria in the patient's dental cavity due to long-time wearing and a hermetic environment. In another embodiment of the present disclosure, the side of the mesial accommodation side wall 1112 away from the maxillary incisal edge is continuously connected to an end of the distal accommodation side wall 1111, enhancing stability of the accommodation space 111 when performing maxillomandibular occlusion. In another embodiment, the side of the mesial accommodation side wall 1112 away from the maxillary incisal edge is partially connected to an end of the distal accommodation side wall 1111, forming a separation gap or a separation hole. This provision ensures stability of maxillomandibular occlusion while increasing breathability for the patient wearing the appliance, thereby avoiding bacteria in the patient's dental cavity due to long-time wearing and the hermetic environment. In another embodiment of the present disclosure, another end of the distal accommodation side wall 1111 is continuously connected to the first reinforcing portion 112, enhancing stability of the accommodation space 111 when performing maxillomandibular occlusion. In another embodiment, the other end of the distal accommodation side wall 1111 is partially connected to the first reinforcing portion 112, forming a separation gap or a separation hole. This provision ensures stability of maxillomandibular occlusion while increasing breathability for the patient wearing the appliance, thereby avoiding bacteria in the patient's dental cavity due to long-time wearing and the hermetic environment. Based on the above embodiments, specific selections on continuous connection or partial connection may be performed on particular parts according to practical needs for corrections, which may achieve correction effects while improving comfort for the patient and the oral cavity environment. Alternatively, a plane or curved structure may further be provided between the accommodation side wall 1112 and the distal accommodation side wall 1111. The plane or curved structure matches the incisal edge or incisal ridge in the teeth in the mandibular anterior region, so as to better accommodate and stabilize relative positions in the mandibular anterior region.

In an embodiment of the present disclosure, the distal accommodation side wall 1111 is a guide surface having a tilt angle guiding the mandible sliding into the accommodation space 111. Herein, the guide surface is a guide plane, a curved guide surface, or a combination of the guide plane and the curved guide surface. When the guide surface is plane, as shown in FIG. 13, after the teeth in the mandibular anterior region contact the first reinforcing portion 112, the guiding of the guide surface enables the teeth in the mandibular anterior region to slide into the accommodation space 111, thereby guiding the positions of the teeth in the mandibular anterior region relative to the maxilla upward to the target occlusion positions in the sagittal direction. In another embodiment of the present disclosure, the guide surface may further be a curved guide surface having a radian. The curved guide surface may be a curved structure having only a segment of radian, or a curved structure formed through connection of a plurality of segments of radian, or a structure formed through connection of a plane surface and a curved surface. For example, either connection of a plane surface to the first reinforcing portion 112 or a curved surface to the first reinforcing portion 112 works. The method that the structure configured to guide the positions of the teeth in the mandibular anterior region relative to the maxilla upward to the target occlusion positions in the sagittal direction falls into the protection scope of the present disclosure. A connection location relationship of multiple combination manners is not particularly defined herein. In a preferable embodiment of the present disclosure, when the distal accommodation side wall 1111 is or partially is the guide surface, the tilt angle is a third intersection angle $\gamma$ formed by the distal accommodation side wall 1111 and a jaw plane on the sagittal cross section, and $30° \leq \gamma \leq 80°$. The third intersection angle $\gamma$ formed is an acute angle. The tilt angle is configured to guide the teeth in the mandibular anterior region sliding into the accommodation space 111 till top (i.e., a position of the accommodation space 111 most distant from the incisal edge of the teeth in the maxillary anterior region) of the accommodation space 111, and the teeth in the mandibular anterior region are relatively stable in the accommodation space 111 in terms of positions. In another preferable embodiment of the present disclosure, the mesial accommodation side wall 1112 is further provided with a stabilizing surface having a tilt angle capable of enabling the mandible to stably occlude within the accommodation space 111. More specifically, the stabilizing surface is a combination of a stability plane surface, a stability curved surface, or a combination of a stability plane surface and a stability curved surface. The stabilizing surface may be a curved structure having only a segment of radian, or a curved structure formed through connection of a plurality of segments of radian, or a structure formed through connection of a plane surface and a curved surface. For example, either connection of a plane surface to the lingual side of the anterior region of the shell-like body 100 or a curved surface to the lingual side of the anterior region of the shell-like body 100 works. The method that the structure is able to stably adjust the positions of the teeth in the mandibular anterior region relative to the maxilla upward to the target occlusion positions in the sagittal direction falls into the protection scope of the present disclosure, A connection location relationship of multiple combination manners is not particularly defined herein. In a preferable embodiment of the present disclosure, when the mesial accommodation side wall is or partially is the guide surface, the tilt angle is a fourth intersection angle δ formed by the mesial accommodation side wall and a jaw plane on the sagittal cross section, and $30° \leq \delta \leq 80°$. The fourth intersection angle δ formed is an acute angle. The tilt angle is configured to stably prevent the teeth in the mandibular anterior region from sliding into the accommodation space 111 till top (i.e., a position of the accommodation space 111 most distant from the incisal edge of the teeth in the maxillary anterior region) of the accommodation space 111.

In an embodiment of the present disclosure, the shell-like body 100 has a geometric structure configured to gradually reposition of the plurality of teeth from the initial positions to the target correction positions. Specifically, when the patient is wearing the shell-like orthodontic appliance, the shell-like body 100 not only accommodates the teeth but also corrects the teeth. For example, the shell-like body 100 has an effect of gradually repositioning the teeth to the target positions from the initial positions, while adjusting the positions of the teeth in the mandibular anterior region relative to the maxilla upward to the target occlusion positions in the sagittal direction. Not only a correction efficiency is improved in certain phases, but for an entire correction solution, the correction efficiency is also improved. In a particular correction case, for example, in a deep overbite case, a patient having a deep mandibular spee curve may use the shell-like orthodontic appliance to perform maxillomandibular position relationship adjustment, while the shell-like body 100 on the shell-like orthodontic appliance is helping to press down the anterior teeth or pull up the posterior teeth to perform leveling of the spee curve to achieve an effect of synchronous correction. In some other embodiments, the shell-like body 100 only functions as accommodating the teeth but not correcting the teeth. This provision is able to enhance comfort for the patient wearing the appliance and only has a correction effect of adjusting the positions of the teeth in the mandibular anterior region relative to the maxilla upward to target occlusion positions in the sagittal direction, but does not correct the rest of the teeth. Therefore, the correction strongly aims at a particular target. Besides, discomfort caused by the shell-like body 100 during teeth correction is reduced.

In an embodiment of the present disclosure, the shell-like body 100, the accommodation space 111, the first reinforcing portion 112 and/or the second reinforcing portion 113 are integrally formed. More specifically, in an embodiment of the present disclosure, the shell-like body 100, the accommodation space 111 and the first reinforcing portion 112 are integrally formed. The shell-like body 100, the accommodation space 111 and the first reinforcing portion 112 may be a structure integrally thermoformed and then cut as particularly desired in correction, or may be a structure formed through 3D-printing. In the integrally-formed method, manufacturing steps are simple, a product is convenient for the patient to wear, and close connection of the shell-like body 100, the accommodation space 111 and the first reinforcing portion 112 results in high wearing safety. There would not be a case where unfixed connection of the shell-like body 100, the accommodation space 111 and the first reinforcing portion 112 causes ingestion by the patient by mistake that leads to unnecessary harm. In another embodiment, the shell-like body 100, the accommodation space 111 and the first reinforcing portion 112 are a separately formed structure. The shell-like body 100, the accommodation space 111 and the first reinforcing portion 112 may be connected through sticking, magnetic attraction and clamping. A separately formed structure is convenient in installation. Shell-like bodies 100, accommodation spaces 111 and first reinforcing portions 112 suitable for the patient's dental cavity and having varied correction effects may be selected for installation according to particular conditions of the patient's dental cavity, so that the patient is treated by personalization. In the other embodiments, the shell-like body 100 and/or the accommodation space 111 and/or the first reinforcing portion 112 and/or the second reinforcing portion 113 are connected in a manner similar to the integrally-formed manner or the separately-formed manner of the shell-like body 100, the accommodation space 111 and the first reinforcing portion 112 as described in the above, which is not further exemplified.

In an embodiment of the present disclosure, an orthodontic system is provided. The orthodontic system includes a plurality of shell-like orthodontic appliances. Herein, at least one of the plurality of shell-like orthodontic appliances is the shell-like orthodontic appliance according to any one in the above embodiments. The plurality of shell-like orthodontic appliances have a geometric shape configured to gradually reposition of the teeth from the initial positions to the target positions. More specifically, the orthodontic system may only be a single-jaw correction. For example, it is only a maxillary correction. During correction, the plurality of shell-like orthodontic appliances are configured to gradually reposition of the teeth from the initial positions to the target positions. For example, when the plurality of shell-like orthodontic appliances are worn on the maxillary teeth, the sagittal adjustment portion 110 is configured to adjust the positions of the teeth in the mandibular anterior region relative to the maxilla upward to the target occlusion positions in the sagittal direction. Meanwhile, the shell-like body 100 has a geometric shape configured to gradually reposition of the teeth from the initial positions to the target positions. In this way, for the patient's teeth, teeth correction is performed synchronously with maxillomandibular position relationship adjustment. That is, orthopedic and orthodontic treatments are performed synchronously, which is more efficient and more comfortable for the patient wearing the appliance.

In an embodiment of the present disclosure, a series of varied plurality of shell-like orthodontic appliances are configured to gradually reposition of the teeth from the initial positions to the target correction positions. Herein, the initial positions are relative positions in a digital model collected from the patient in medical treatment. The target correction positions are positions of a final correction result obtained by an orthodontist or a medical designing person according to the patient's request and the patient's oral cavity conditions, Due to individual difference, oral cavities of different patients have distinguishing conditions. The teeth are to be gradually moved from the initial positions to the target positions, during which a series of varied plurality of shell-like orthodontic appliances are needed to be worn for correction of the teeth.

In an embodiment of the present disclosure, a further orthodontic system is provided. The orthodontic system includes a plurality of orthodontic appliance sets that include at least one orthodontic appliance set described in the following text. The plurality of orthodontic appliance sets have a geometric shape configured to gradually reposition of the teeth to the target positions from the initial positions. In the following, an orthodontic appliance set in this embodiment is specifically described in the following.

In an embodiment of the present disclosure, a further orthodontic appliance set is provided, the orthodontic appliance set including a maxillary orthodontic appliance and a mandibular orthodontic appliance. Herein, the maxillary orthodontic appliance is a maxillary orthodontic appliance according to any one of the above embodiments, and the mandibular orthodontic appliance is a shell-like mandibular orthodontic appliance worn corresponding to the maxillary orthodontic appliance. When a shell-like maxillary orthodontic appliance is being worn, the shell-like body 100 accommodates the maxillary teeth, and the sagittal adjustment portion 110 adjusts the positions of the teeth in the mandibular anterior region relative to the maxilla upward to the target occlusion positions in the sagittal direction. Meanwhile, the shell-like mandibular orthodontic appliance is being worn on the mandibular teeth, accommodating the mandibular teeth. The shell-like mandibular orthodontic appliance may only be a shell-like orthodontic appliance accommodating the mandibular teeth or a geometric structure configured to gradually reposition of the mandibular teeth from the initial positions to the target correction positions. In synchronous maxillary and mandibular correction, for a patient having a deep mandibular Spee curve, the anterior teeth may be pressed down or the posterior teeth may be pulled up to perform leveling of the spee curve. In this way, when performing maxillomandibular position relationship adjustment, the maxillary and mandibular teeth are corrected, and orthopedic and orthodontic treatments are performed synchronously.

In an embodiment of the present disclosure, a series of varied plurality of shell-like orthodontic appliance sets are configured to gradually reposition of the teeth from the initial positions to the target correction positions. Herein, the initial positions are relative positions in a digital model collected from the patient in medical treatment. The target correction positions are positions of a final correction result obtained by an orthodontist or a medical designing person according to the patient's request and the patient's oral cavity conditions. Due to individual difference, oral cavities of different patients have distinguishing conditions. The teeth are to be gradually moved from the initial positions to the target positions, during which a series of varied plurality of shell-like orthodontic appliances are needed to be worn for correction of the teeth.

Figure 14:
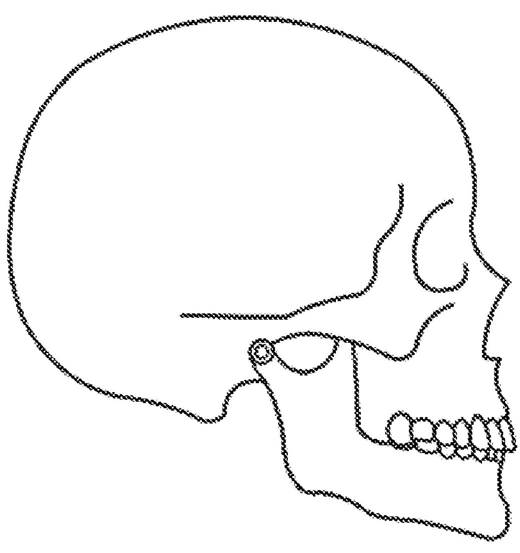
FIG. 14 is a view of a lateral-position skull of an initial-state patient according to an embodiment of the present disclosure.
Figure 15:
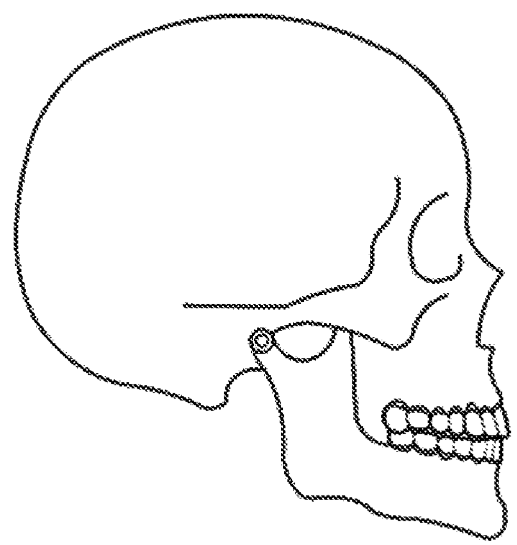
FIG. 15 is a view of a lateral-position skull of a patient after the patient wears the shell-like orthodontic appliance according to an embodiment of the present disclosure.

By wearing the shell-like orthodontic appliance, the orthodontic appliance set, the orthodontic system or a correction system, the patient's maxillary and mandibular relative positions are able to be adjusted from the initial state shown in FIG. 14 to the target correction positions shown in FIG. 15.

In an embodiment of the present disclosure, a manufacturing method for the shell-like orthodontic appliance as described in the above is provided. The manufacturing method is based on the designing method described above to prepare the designed shell-like orthodontic appliance. The manufacturing method includes a manufacturing method of thermoforming and then cutting or a manufacturing method of direct 3D-printing.

In an embodiment of the present disclosure, a manufacturing module in the manufacturing method may be an additive manufacturing machine. To manufacture an orthodontic appliance by using the additive manufacturing machine is to directly print the orthodontic appliance from a finite element digital model of the orthodontic appliance obtained as required by using the 3D printing technology. The 3D printing technology may be stereolithography (SLA) or digital light processing (DLP).

In an embodiment of the present disclosure, the manufacturing module of the manufacturing method may further be a 3D printing device, a laminating device, a cutting device, a polishing device, or a cleaning and disinfection device, Operations of the manufacturing method are as follows. Firstly, the 3D printing technology is used to directly print a finite element digital model of a digital dental model as required. Then lamination is performed on a printed 3D dental model. Finally, such operations as cutting, polishing, cleaning and disinfection are performed a laminated orthodontic appliance to obtain a completed orthodontic appliance.

Although the above description shows particular embodiments of the present disclosure, those skilled in the art shall understand that these are merely examples. The protection scope of the present disclosure is defined by the Claims. These embodiments may be changed or amended by those skilled in the art without departing from the principle and substance of the present disclosure, but the change and amendment fall into the protection scope of the present disclosure.

What is claimed is:

1. A shell-like orthodontic appliance, comprising:

a shell-like body provided with a cavity for accommodating a plurality of maxillary teeth; and a sagittal adjustment portion, disposed on a lingual side in an anterior region of the shell-like body and at least partially connected to the lingual side in the anterior region of the shell-like body;

the sagittal adjustment portion has a geometric structure configured to stabilize a maxillomandibular occlusion relationship and reduce a deformation of the shell-like body caused by occlusion while to adjust positions of teeth in a mandibular anterior region relative to a maxilla in a forward direction to target occlusion positions in a sagittal direction when the shell-like orthodontic appliance is worn;

the geometric structure comprises an accommodation space and a first reinforcing portion; the accommodation space defining a wall comprising an extending portion extending directly from the lingual portion of the shell-like body along the anterior region and a bending portion extending from the extending portion, and the first reinforcing portion is configured to at least partially offset deformation of the shell-like body caused by occlusion; the accommodation space is configured to at least accommodate an incisal edge of the teeth in the mandibular anterior region or a portion adjacent to the incisal edge of the teeth in the mandibular anterior region, the first reinforcing portion has opposing first and second ends, the first end of the first reinforcing portion is connected to the bending portion of the wall and extends along the anterior portion of the shell-like body, and the second end of the first reinforcing portion extends in a distal direction, the reinforcing portion extending along the anterior region and has left and right sides directly connected to left and right sides of the the shell-like body in the anterior region; and in a long axis direction of the teeth in a sagittal cross section, a region of the first reinforcing portion configured to contact the incisal edge of the teeth in the mandibular anterior region is configured to be more adjacent to an incisal edge of the maxillary teeth in an anterior region than a region of the accommodation space configured to contact the incisal edge of the teeth in the mandibular anterior region when the shell-like orthodontic appliance is worn.

2. The shell-like orthodontic appliance according to claim 1, wherein in the sagittal cross section, a first angle α is formed at the connection between the first reinforcing portion and the bending portion, and $90 \leq \alpha \leq 160°$.

3. The shell-like orthodontic appliance according to claim 1, wherein the connection between the left and right sides of the first reinforcing portion and the shell-like body is a smooth transiting surface, and the first reinforcing portion is connected with a mesial end surface of a cavity for accommodating first premolar tooth at both left and right sides of the shell-like body in a smooth transition.

4. The shell-like orthodontic appliance according to claim 3, wherein the second end of the first reinforcing portion substantially follows a curve radian of teeth in an anterior region.

5. The shell-like orthodontic appliance according to claim 1, wherein in the sagittal cross section, the first reinforcing portion has a width of 2 to 5 mm in a mesial-distal direction.

6. The shell-like orthodontic appliance according to claim 1, wherein the accommodation space is a groove continuously distributed at the lingual side of the anterior region of the shell-like body and concaved in a palate direction, and the groove is configured to reduce deformation of the shell-like body generated in a buccal lingual side direction or in the sagittal direction.

7. The shell-like orthodontic appliance according to claim 1, wherein the accommodation space has a width of 1.5 to 4.0 mm in a mesial-distal direction in the sagittal cross section.

8. The shell-like orthodontic appliance according to claim 1, wherein the first reinforcing portion has an elastic modulus greater than an elastic modulus of the shell-like body.

9. The shell-like orthodontic appliance according to claim 8, wherein the first reinforcing portion has a hardness greater than a hardness of the shell-like body, and the first reinforcing portion has a Shore hardness of 65D to 80D, and the shell-like body has a Shore hardness of 50D to 75D.

10. The shell-like orthodontic appliance according to claim 1, wherein the first reinforcing portion is a multi-layered structure comprising a basic layer and at least one reinforcing layer, and the at least one reinforcing layer at least partially covers the basic layer.

11. The shell-like orthodontic appliance according to claim 10, wherein the first reinforcing portion formed by the multi-layered structure has a total thickness greater than a thickness of the shell-like body, and the reinforcing layer has an elastic modulus greater than an elastic modulus of the basic layer.

12. The shell-like orthodontic appliance according to claim 1, wherein the first reinforcing portion has a thickness of 0.7 to 2.0 mm, and the shell-like body has a thickness of 0.5 to 1.0 mm.

13. The shell-like orthodontic appliance according to claim 1, wherein the first reinforcing portion, the accommodation space and the shell-like body are integrally formed.

14. The shell-like orthodontic appliance according to claim 1, wherein a second reinforcing portion is provided at the second end of the first reinforcing portion, the first reinforcing portion and the second reinforcing portion enclose to form an accommodating space, the first reinforcing portion and the second reinforcing portion are provided with an intersection angle β, and $90° \leq \beta < 180°$.

15. The shell-like orthodontic appliance according to claim 14, wherein the accommodating space accommodates a reinforcing block, the second reinforcing portion has one of a male structure and a female structure matching each other, and the reinforcing block has the other of the male structure and a female structure.

16. The shell-like orthodontic appliance according to claim 1, wherein

The extending portion of the wall of the accommodation space is a mesial accommodation side wall and the wall further comprising a distal accommodation side wall, a portion of the mesial accommodation side wall away from the lingual side in the anterior region of the shell-like body is at least partially connected to the bending portion, an end of the distal accommodation side wall connected to another end of the bending portion; and another end of the distal accommodation side wall is at least partially connected to the first reinforcing portion.

17. The shell-like orthodontic appliance according to claim 16, wherein the distal accommodation side wall is a guide surface configured to guide the mandible to slide into the accommodation space, and the guide surface is a guide plane, a curved guide surface, or a combination of the guide plane and the curved guide surface.

18. The shell-like orthodontic appliance according to claim 17, wherein when the distal accommodation side wall is the guide plane, an intersection angle γ is formed by the distal accommodation side wall and a jaw plane in a sagittal cross section, and $30° \leq \gamma \leq 80°$.

19. The shell-like orthodontic appliance according to claim 16, wherein the mesial accommodation side wall has a stabilizing surface having a tilt angle configured to allow the mandible to stably occlude within the accommodation space, and the stabilizing surface is a stabilizing plane, a curved stabilizing surface, or a combination of the stabilizing plane and the curved stabilizing surface, wherein the stabilizing surface is a surface of the mesial accommodation side wall facing the distal accommodation side wall.

20. The shell-like orthodontic appliance according to claim 1, wherein the shell-like body has a geometric structure configured to gradually reposition of the maxillary teeth from initial positions to target correction positions.

21. An orthodontic system, comprising a plurality of shell-like orthodontic appliances, wherein at least one of the shell-like orthodontic appliances is the shell-like orthodontic appliance according to claim 1.

* * * * *